June 3, 1930.  A. F. LEAR  1,761,080
TYPEWRITING MACHINE
Filed Dec. 9, 1926

Inventor:
Arthur F. Lear
by B. C. Stickney
Attorney.

Patented June 3, 1930

1,761,080

UNITED STATES PATENT OFFICE

ARTHUR F. LEAR, OF BROOKLYN, NEW YORK, ASSIGNOR TO UNDERWOOD ELLIOTT FISHER COMPANY, OF NEW YORK, N. Y., A CORPORATION OF DELAWARE

TYPEWRITING MACHINE

Application filed December 9, 1926. Serial No. 153,507.

This invention relates to portable typewriting machines, and more particularly to means for mounting the typewriter within a portable carrying case to withstand the shock and abuse incident to transportation.

The invention may be regarded as an improvement on the pending application of William A. Dobson, filed October 29, 1925, Serial No. 65,524, where the forward part of the machine is held in position on the baseboard by a pair of screws passing through holes in brackets secured to the machine side frames and entering the threaded holes in bushings set in the baseboard, and each screw having a spring compressible between the head of the screw and the bracket to resiliently hold the machine clamped to the baseboard. The shaking and jarring of the carrying case in hand transportation frequently caused one or both of the screws to loosen, leaving the machine loose within the carrying case. A careless assembler would frequently turn the screws so far as to fully compress the springs between the heads of the screws and the brackets, thus destroying the function of the springs as cushion elements, and sometimes the threading of the screws would bend down the ears of the brackets into contact with the baseboard. Sometimes the assembler would not compress the springs sufficiently.

A feature of the present invention is to provide means to overcome these objections. For this purpose there is provided a spring-tension gage in the form of a shoulder upon a screw, the shoulder of which extends through the opening in the lug, and the thread portion of the screw is screwed into a bushing in the casing, until the shoulder contacts with the casing, thereby permitting the screw to be tightened, without causing any damage, as tight as possible. Between the lug and the head of the screw there is provided a spring, and through the action of this spring the lug is pressed downwardly, thereby holding the typewriter in place. When the machine is now being carried around and generally handled, all the jars will be absorbed by the spring, and in this way no injury can occur to either the typewriter or the threads of the bushing into which the screw is threaded.

Modern production methods require interchangeability of parts and the assembly of these parts under conditions that require as little mental effort and skill, on the part of the assembler, as possible. The present improvement provides means whereby the screws may be manually turned into their sleeves in the baseboard to a mechanically fixed depth, and the assembler has only to see that the screws are set tight. The assembling and setting of the screws cannot either lessen or increase the predetermined compression of the springs under the screw-heads, and each and every machine assembled to a baseboard will be held uniformly in suspension between the rubber feet on the under side and a predetermined spring compression at the upper side thereof, over which the assembler has no control.

To this end, the clamping screws are provided with gages in the form of shoulders, the length of the shoulder under each head of a screw positively establishing a limit or gage for the compression of the spring surrounding the screw. Long flanged bushings are inserted in the baseboard from the under side with the top end of the bushing flush with the top face of said board, so that the shoulder or gage will engage the exposed end of the metallic bushing. Thus the screw is tightened, which heretofore has been left loose, and this tightening prevents accidental loosening of the screw when properly set, and it also prevents bending and breaking of the screw by enclosing the whole threaded section of the screw within the bushing.

The flanged head of the bushing prevents the bushing from being pulled through the board by the screw, and the length of the bushing provides for a long threaded section for the screw permitting the use of sufficient threads, to prevent the stripping of the threads through the careless use of the screwdriver. The compression springs are formed and cut to uniform lengths with a suitable allowance for compression by the screws for a predetermined resistance to counteract any vibration the assembled machine may be subjected to in transportation. These simple but very important changes in the construction and organization of the screws, the bushings and the springs, render the screws and springs interchangeable at any time and place to produce the same uniform results of preventing the screws from loosening, and preventing an over or under compression of the machine cushioning springs.

Other features and advantages will hereinafter appear.

In the accompanying drawings.

Figure 1:
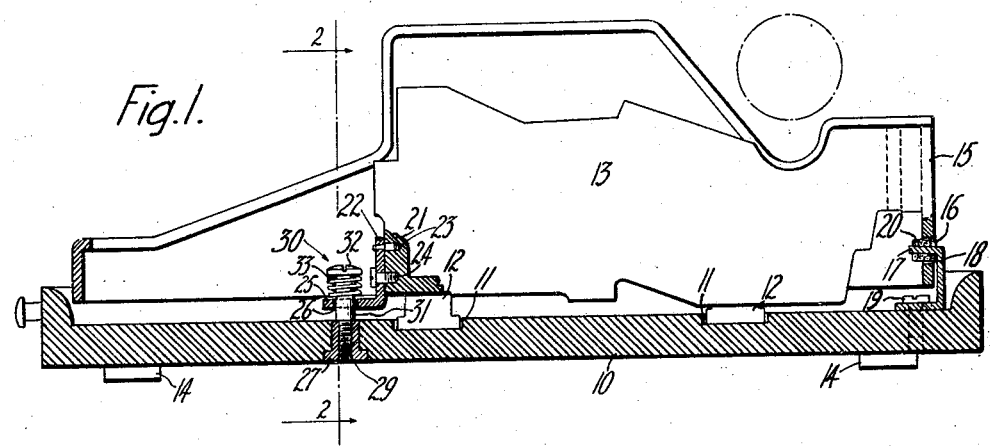
Figure 1 is a longitudinal vertical section through the baseboard of a portable carrying case, showing the frame of a portable machine secured thereto according to the present invention. The cover that usually closes the machine on the top and four sides is not being shown.
Figure 2:
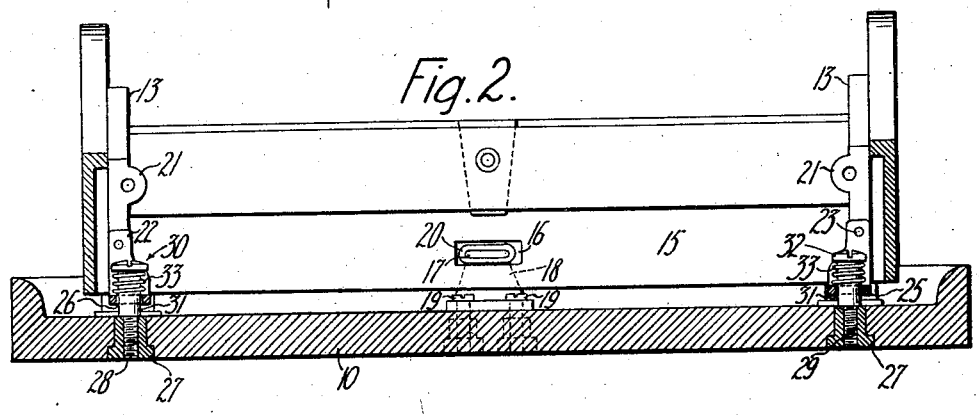
Figure 2 is a vertical cross-section through Figure 1, on a plane indicated on the line 2—2, looking in the direction of the arrow.
Figure 3:
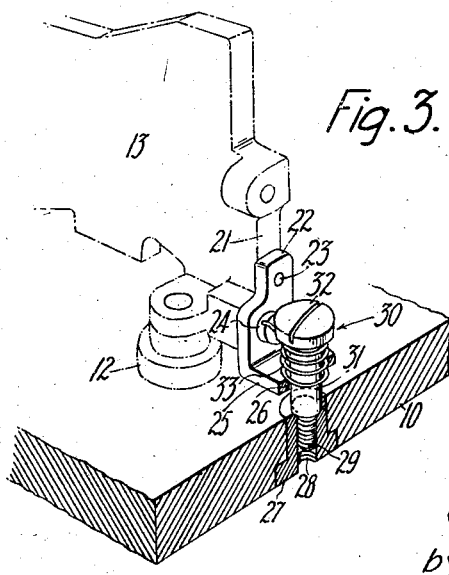
Figure 3 is an enlarged view, in perspective, showing in detail the several parts of one machine-clamping screw assembled in operative position.

10 indicates a baseboard having recesses in the upper face thereof to form machine-centering sockets 11 for the reception of the rubber feet 12 secured to the lower edges of the machine-frame 13. The baseboard may also be provided with cushioning feet 14.

The rear wall 15 of the machine-frame 13 is formed with a central opening 16 to receive the free end of a machine-retaining ear 17 formed at the upper end of a bracket 18, secured to the base board 10, as by screws 19. The ear 17 may be covered, as by stretching a section of rubber tubing 20 thereover to insulate the ear from the edges of the opening 16 in the machine-frame. The machine may be set upon the baseboard and shoved rearwardly to cause the rubber-incased ear 17 to enter the opening 16 in the rear wall thereof to approximately center the machine to the board and assist in aligning the rubber feet 12 within the sockets 11, the ear 17 preventing the two rear feet on the machine-frame from being lifted out of its sockets.

To coact with the central ear 17 at the rear wall of the frame, means are provided at each forward end of the side walls 21 of the machine to further secure the machine to the base at two widely-separated points that assume a triangular relation to the central ear 17 at the rear of the frame. These means include brackets 22 located upon the front faces of the side walls 21 of the frame by dowels 23 and secured thereto by screws 24, and each bracket formed with an extension 25 that projects forwardly of the frame parallel to the upper face of the baseboard with suitable clearance-space between the extension and the baseboard, and also formed with a perforation 26.

The baseboard 10 may be bored and counterbored from the under side and in alignment with the perforations 26 in the two extensions 25 to form a shouldered recess into which a shouldered bushing 27 may be forced from the under side with the top face thereof flush with the face of said board. Each bushing 27 is provided with a threaded hole 28 extending therethrough to receive the threaded end 29 of a screw 30 having a cylindrical section 31 shouldered down to the size of the threads, the shoulder so formed serving to limit the threading of the screw into the bushing 27 by engaging the face of the bushing, and when the screw, as a whole, is set against the bushing, accidental loosening of the threaded bushing is prevented. The cylindrical section 31 of each screw passes through the clearance-perforations 26 of the extensions 25, and, between said extensions and the head 32 of each screw, a coil compression spring 33 encircles the section 31.

As already described, the machine-frame is first assembled to the baseboard by effecting an interlock between the ear 17 and the opening 16 in the rear wall 15 thereof, with the feet of the machine resting within the sockets 11. The screws 30 with the springs 33 under the heads 32 thereof are dropped through the perforations 26 of the extensions 25, and each screw threaded home with the shoulder thereof jammed against the face of the bushing. The threading-in of the screws compresses the springs 33 a predetermined extent between the heads 32 and the extensions 25, making it impossible for the assembler or novice, in clamping any machine to the baseboard, to change the compression of the springs over or under a predetermined degree for tension. Furthermore, the effect of setting the screws against the faces of the bushings prevents the screws from being shaken loose in transportation, gives greater strength to the threaded sections through their being wholly incased within the bushings, and prevents stripping of the threads because of the long threaded engagement of the screws within the long bushings.

It will be understood that the base board 10, that supports the typewriting machine, forms a part of a portable carrying case, the other part of the case being a cover, not shown, that sets over the base board to enclose the machine on the top and four sides, in the usual manner.

Variations may be resorted to within the scope of the invention, and portions of the improvements may be used without others.

Having thus described my invention, I claim:

1. In a portable typewriting machine having a frame with a front wall and a rear wall formed with a central opening and a casing, the combination with means mounted upon the casing and arranged to enter the opening in the frame to center and secure the rear of the frame to the casing, of a pair of brackets secured to the front wall of the frame, a pair of shouldered screws to pass through the brackets, a pair of springs compressible more or less by the screws against said brackets, and a pair of threaded bushings or nuts secured to the casing to engage the screws, whereby the front wall of the frame will be resiliently clamped to the casing through the compression of the springs, the shoulders of the screws engaging the faces of the nuts as gages to limit the compression of the springs and also by friction to prevent accidental loosening of the screws.

2. In a portable typewriting machine having a frame and a casing, the combination with a hook on the casing to interlock with the frame to hold down the rear end of the frame, of adjustable means yieldably holding down the front of the machine, said means including headed screws passing through parts of the frame and threaded into the casing, springs mounted on the screws between the heads thereof and the frame, effective to be more or less compressed by the degree of insertion of the screws into the casing, and means to limit the amount of said insertion to prevent over-compression of the springs.

3. In a portable typewriting machine having a frame with a front wall and an apertured rear wall, and a casing supporting the machine, the combination with means mounted upon the casing and arranged to enter said aperture in the rear wall to center and secure the frame to the casing, of headed screws passing through said front wall of the frame, springs mounted on the screws under the heads thereof and bearing against the frame and compressible by the screws to a greater or less degree, and means on the casing effective to co-operate with the screws to limit the degree to which said springs may be compressed, whereby the front wall of the frame will be resiliently clamped to the casing by a predetermined compression of the springs by the screws.

4. In a portable typewriting machine, the combination with a frame including a front wall and an apertured rear wall, a base upon which the machine is mounted, and means on the base engaging said aperture to secure the rear of the frame to the base, of a shouldered screw carried by the front wall of the frame and assembled to the base, a head on said screw, a spiral spring mounted on the screw between said head and the front wall, effective when assembled to press said wall downward against the base, and a nut in the base to receive the threaded end of the screw, said shoulder of the screw engaging the face of the nut as a gage to limit the degree of compression of the spring.

ARTHUR F. LEAR.